Patented Oct. 15, 1935

2,017,632

UNITED STATES PATENT OFFICE 2,017,632

ROAD SURFACING MATERIAL

Joseph E. Moody, Chicago, Ill.

No Drawing. Application January 30, 1933,
Serial No. 654,305

5 Claims. (Cl. 106—31)

My invention relates to road surfacing materials and a method of making the same, and more particularly to the production of a material of this character having a hard stony aggregate as a base and having a binder of asphalt.

The primary object of the invention is to provide a process which is particularly applicable to the protection of a paving or protection mixture of the above mentioned character that can be transported or stored and laid within a reasonable time after preparation without reheating.

It is a further purpose of the invention to provide a novel process of producing a mixture such as referred to above which will enable the mixture to avoid cooling off to the point of hardening for a considerable length of time beyond that which is possible without employing this process.

My invention further contemplates the process of preparing a paving or surfacing mixture including a hard base aggregate, a hard asphalt, and a softer asphalt, which separates the particles of aggregate and their coatings in such a fashion as to make a fluffy mixture in which the particles are engaging each other lightly at various points instead of being wedged together and which can be handled readily at comparatively low temperatures without the necessity of embodying materials which are fluid at ordinary atmospheric temperature or foreign matter to coat the particles.

Custom and experience indicate that for most purposes the bitumen in a pavement should have a penetration of between 50 and 70 A. S. T. M. after thorough commingling and compaction of the material. This penetration may vary somewhat in different climates. While I prefer to use as the hard coating an asphalt of 25 to 45 penetration and for the soft coating an asphalt of 100 to 120 penetration, I may, of course, use a hard asphalt of less penetration and a soft asphalt that might even be liquid at atmospheric temperature. The ultimate proper penetration of the bitumen can be obtained by such a combination.

In carrying out the process, I may use any suitable graduated aggregate although I prefer to use a hard stony aggregate such as will pass through a ten mesh screen and about 75% of which is retained on an 80 mesh screen. This aggregate I heat up to dry the same and then while violently agitating the aggregate so as to cause the particles thereof to be continuously separating from each other, I add the hard asphalt preferably having a penetration of from 25 to 45 A. S. T. M. and heated to about 250 to 275 degrees F. which is the temperature to which the aggregate has been raised. I next drop the temperature of the mixture while continuing the agitation thereof so that the particles of stone become coated individually with the harder asphalt, and this coating will have the surface hardened so as to form a protective and somewhat rigid outer surface for the particles to hold the stone particles apart.

This cooling of the mixture of aggregate and hard asphalt may be accomplished in several ways, as for example by using means for passing cooling air through the mixture. This is more or less accomplished by the violent agitation of the mixture which has a tendency to work the air down into the entire body. I may also add cold 10 to 12 per cent of the aggregate after the hot dry aggregate has been thoroughly mixed with the hard asphalt and continue the mixing of this cold aggregate until the temperature of the mass becomes uniform. I find in agitating the aggregate that the ordinary pug mill type of mixer is satisfactory providing the blades are set at the proper angle and the amount of material introduced into the mixer at one time is not too great. I have also found that the speed of running a mixer has considerable bearing on making the mass fluffy.

The process of agitating the aggregate while applying the coats of asphalt does not in any manner make the asphalt soft or spongy. On the contrary, a considerable hardening effect is seemingly produced. It is my belief that the asphalt is oxidized to a considerable extent by the process. I next preferably remove the mixture from the agitator and pass the same into a second agitator. The cooling of the mixture is carried on to such an extent as to bring it down into the neighborhood of 200 degrees F. when it reaches the second mixer or agitator. The mixture is preferably maintained in motion without compressing it all the time until it reaches the second agitator where it is again violently agitated and the soft asphalt preferably having a penetration of between 100 and 120 A. S. T. M. is added. The mixture is violently agitated as the fluid soft asphalt is added thereto and whipped up by the agitator into a fluffy mass which has therein a considerable amount of imprisoned air and gas. I preferably arrange a suction device for sucking off the hot gases from the top of the mixture as this removes the heat from the mixture and aids in cooling it and in addition appears to increase the fluffiness of the mixture. After the mixture is thoroughly worked to the desired state of fluffiness, I add a pulverulent material such as would pass a 200 mesh screen as a filler. This pulverulent material may be limestone dust which I have found to be quite satisfactory. The dust is mixed into the mixture and is added cold so that the addition of it to the mixture further drops the temperature thereof. Preferably I add the dust last although I may add some or all at the end of the first coating, and, if only part is added after the first coating, more may be added after the second asphalt coating, and I find that I can leave the dust out entirely if I desire. I also find that if I add too much dust the resulting mixture is tough and does not handle so easily. Preferably, therefore, I limit the dust to 10 per cent of the total mass.

The material treated in the above fashion can be removed from the second agitator and stored in a pile or hauled in trucks directly to the place where it is to be used. The temperature at which it works best is to remove it from the agitator at about 200 degrees or somewhat less. The volume of the material as removed from the agitator is considerably increased over the original volume owing to the fact that it has been agitated and made fluffy.

When this material is spread upon the road surface, it appears to retain its heat during the transportation and for a considerable length of time after spreading, in fact a much longer time than ordinary mixtures. It also remains workable, without any apparent change after being spread, for at least an hour. Owing to its fluffy state, however, it is necessary to have a thicker coat when spreading the mixture than has heretofore been used to give the ultimate required thickness when the mixture is rolled down.

The fact that it does not change its consistency or workability even after being spread for some time makes it possible for the rollers and spreaders to have a much greater latitude in the time elapsing between the spreading and rolling. This facilitates the laying of the material and avoids serious failures due to not rolling the material at the proper time after it is spread. The amount of asphalt used with any aggregate is preferably such as to fill the calculated voids to within three per cent over or under. Failure to use enough asphalt results in insufficient binding while if too much asphalt is used the resultant product when rolled produces a bitumen surface which is very slippery and dangerous and therefore unsatisfactory for paving.

I may also use this process in making a completely cold mix by continuing the agitation after the dust is added and cooling the mixture down to atmospheric temperature before storing. This is a cold mix that can be transported and laid directly.

I find also that I obtain very good results by varying the process hereinbefore described in detail in the following fashion: First coat the hot aggregate with hard asphalt; then, while agitating the mixture rapidly, I cool it down to atmospheric temperature; to this mixture at atmospheric temperature I then add the soft asphalt in a hot liquid condition agitating the mixture rapidly to incorporate the necessary fluffiness; and thereafter I add dust up to 10 per cent. This last process gives a relatively cold mix also, but does not need to be agitated until it again reaches atmospheric temperature after addition of the soft asphalt.

Considerable advantage in speed of production is obtained by using part of the original aggregate cold and dry and adding this after the rest of the hot aggregate has been partially mixed with the hard asphalt. In a commercial plant this material is produced in huge quantities, and the problem of cooling is a difficult one. The cold aggregate and the cold pulverulent filler both aid in quickly dropping the temperature of the large masses being agitated and thus increase the rate of production.

Having thus described my invention, what I claim as new and desire to secure by Letters Patent is:

1. The method of producing a road surfacing material which comprises the violent agitation of a dry hard stony aggregate with a hard asphalt of a penetration of less than 50 A. S. T. M. at a temperature high enough to make the asphalt liquid, continuing the agitation of the mass and cooling it until the asphalt coating of the particles has hardened on the surface and thereafter without allowing the mass to set adding thereto a soft asphalt coating of a penetration around 100 A. S. T. M. or above which is not fluid at ordinary atmospheric temperatures while violently agitating the mass to coat the particles and expand the mass into a fluffy air filled state and thereafter mixing with the mass a quantity of pulverulent filler.

2. The method of producing a road surfacing material which comprises mixing together by violent agitation a dry hard stony aggregate and a hard asphalt of a penetration about 25 to 45 A. S. T. M. at a temperature of about 250° F. to 275° F. in sufficient quantity to coat the particles of aggregate, cooling the mixture, while agitating it to a temperature sufficient to harden the outer surfaces of the asphalt on the particles of aggregate, and thereafter adding at a temperature around 200° F. a softer asphalt having a penetration of about 100 to 120 A. S. T. M. and which is not fluid at ordinary atmospheric temperatures in sufficient quantity to make the total asphalt content substantially equal in volume to the calculated voids in the aggregate, and thoroughly spreading the softer asphalt over the particles and incorporating in the mass a substantial amount of gas to make it fluffy.

3. The method of producing a road surfacing material which comprises mixing together by violent agitation a dry hard stony aggregate and a hard asphalt of a penetration about 25 to 45 A. S. T. M. at a temperature of about 250° F. to 275° F. in sufficient quantity to coat the particles of aggregate, cooling the mixture, while agitating it to a temperature sufficient to harden the outer surfaces of the asphalt on the particles of aggregate, and thereafter adding at a temperature around 200° F. a softer asphalt having a penetration of about 100 to 120 A. S. T. M. and which is not fluid at ordinary atmospheric temperatures in sufficient quantity to make the total asphalt content substantially equal in volume to the calculated voids in the aggregate, and thoroughly spreading the softer asphalt over the particles and incorporating in the mass a substantial amount of gas to make it fluffy, and cooling the mass while agitating it, to atmospheric temperature.

4. The method of producing a road surfacing material which comprises mixing together by violent agitation a dry hard stony aggregate and a hard asphalt of a penetration about 25 to 45 A. S. T. M. at a temperature of about 250° F. to 275° F. in sufficient quantity to coat the particles of aggregate, cooling the mixture, while agitating it to a temperature sufficient to harden the outer surfaces of the asphalt on the particles of aggregate, and thereafter adding at a temperature around 200° F. a softer asphalt having a penetration of about 100 to 120 A. S. T. M. and which is not fluid at ordinary atmospheric temperatures in sufficient quantity to make the total asphalt content substantially equal in volume to the calculated voids in the aggregate, and thoroughly spreading the softer asphalt over the particles and incorporating in the mass a substantial amount of gas to make it fluffy, and adding after the first asphalt coating a quantity not to exceed 10 per cent by volume of the aggregate of a cold pulverulent filler.

5. The method of producing a road surfacing material which comprises the violent agitation of a dry hard stony aggregate with a hard asphalt of a penetration of less than 50 A. S. T. M. at a temperature high enough to make the asphalt liquid, then adding a substantial amount of cold aggregate, and continuing the agitation of the mass and cooling it until the asphalt coating of the particles has hardened on the surface and thereafter without allowing the mass to set adding thereto a soft asphalt coating of a penetration around 100 A. S. T. M. or above which is not fluid at ordinary atmospheric temperatures while violently agitating the mass to coat the particles and expand the mass into a fluffy air filled state and thereafter mixing with the mass a quantity of pulverulent filler.

JOSEPH E. MOODY.